(12) United States Patent
Spring

(10) Patent No.: US 7,580,990 B1
(45) Date of Patent: Aug. 25, 2009

(54) METHOD AND SYSTEM FOR FOOTPRINT MINIMIZED, HTML/HTTP-BASED SYSTEMS FOR JAVA-BASED EMBEDDED DEVICE MANAGEMENT APPLICATIONS

(75) Inventor: Maximilian Josef Spring, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 765 days.

(21) Appl. No.: 10/697,069

(22) Filed: Oct. 29, 2003

(51) Int. Cl.
*G06F 15/16* (2006.01)
(52) U.S. Cl. .................... 709/219; 709/203; 709/217
(58) Field of Classification Search ............... 709/217, 709/203, 219; 718/1
See application file for complete search history.

(56) References Cited

U.S. PATENT DOCUMENTS

| | | | | |
|---|---|---|---|---|
| 5,956,487 | A * | 9/1999 | Venkatraman et al. | 709/218 |
| 5,973,696 | A * | 10/1999 | Agranat et al. | 715/760 |
| 6,112,235 | A * | 8/2000 | Spofford | 709/223 |
| 6,112,246 | A * | 8/2000 | Horbal et al. | 709/230 |
| 6,353,853 | B1 * | 3/2002 | Gravlin | 709/219 |
| 6,418,471 | B1 * | 7/2002 | Shelton et al. | 709/227 |
| 6,788,980 | B1 * | 9/2004 | Johnson | 700/1 |
| 6,801,920 | B1 * | 10/2004 | Wischinski | 707/203 |
| 6,865,732 | B1 * | 3/2005 | Morgan | 717/140 |
| 7,200,644 | B1 * | 4/2007 | Flanagan | 709/219 |
| 2002/0083172 | A1 * | 6/2002 | Knowles et al. | 709/225 |
| 2002/0093676 | A1 * | 7/2002 | Parry | 358/1.15 |
| 2002/0095522 | A1 * | 7/2002 | Hayko et al. | 709/311 |
| 2002/0196460 | A1 * | 12/2002 | Parry | 358/1.15 |

* cited by examiner

*Primary Examiner*—Ario Etienne
*Assistant Examiner*—Philip J Chea
(74) *Attorney, Agent, or Firm*—Stolowitz Ford Cowger LLP

(57) ABSTRACT

A method and system for accessing HTML/HTTP based information for Java-based embedded applications. Specifically, in one embodiment, a method is disclosed for accessing HTTP/HTML based information from a client workstation. The embodiment of the method begins by establishing communication with a device that is associated with an embedded application through a first browser window that is Java-enabled. The method then continues by retrieving a Java applet from the device for implementing the embedded application. Then, the embodiment continues by running a hypertext transfer protocol (HTTP) server inside the Java applet on the client workstation. Thereafter, the embodiment continues by generating hypertext markup language/hypertext transfer protocol (HTML/HTTP) based files with the HTTP server, wherein the HTML/HTTP based files are associated with the embedded application.

15 Claims, 4 Drawing Sheets

METHOD AND SYSTEM FOR FOOTPRINT MINIMIZED, HTML/HTTP-BASED SYSTEMS FOR JAVA-BASED EMBEDDED DEVICE MANAGEMENT APPLICATIONS

BACKGROUND OF THE INVENTION

1. Field of the Invention

Embodiments of the present invention relate to the field of Java-based embedded device management applications. More particularly, embodiments of the present invention relate generally to accessing information from Java-based embedded device management applications from a client workstation.

2. Related Art

An embedded application (e.g., device management application) is an application which neither needs to be explicitly installed on a client workstation, nor actually installs pieces on a client workstation. The embedded application comes with the device and can be accessed through some network (e.g., the Internet). As soon as there is Internet protocol (IP) connectivity between a client workstation and the device, a user can bring up the embedded application within a browser on the client workstation.

The advantages of having an embedded application is that a user that is Web-enabled can access information associated with the embedded application and interact with the embedded application without having to load or install anything onto the client workstation. As a result, via any workstation that is Web-enabled, a user can access and interact with the embedded application.

One of the disadvantages of having an embedded application on a device is that the device needs to provide some HTTP server capabilities to interact with the Web-enabled workstation. However, processing power from the central processing unit (CPU) on the device is extremely limited, and as such, the device can only provide limited HTTP server capabilities. Also, memory (e.g., flash memory) on the device is extremely limited, which reduces the ability to store larger applications. Therefore, storing any content in a compressed format on the device is highly desirable.

Information that is associated with the embedded application (e.g., a help system of a device management application) can be implemented as a set of interlinked hypertext markup language (HTML) files that are accessed through a browser window on a client workstation. Since the browser can only show files which it can retrieve via the hypertext transfer protocol (HTTP), an HTTP server needs to be located where it can serve the corresponding HTML files (e.g., the help system of the device management application). Typically, the HTTP server is located on the device, and is used to access the information located on the device.

Since there is typically insufficient processing power available from the CPU for providing more complex and dynamic HTTP server capabilities, a well-established technique is to implement the embedded application as a Java applet, that is running within the Java virtual machine (JVM) of the browser on the client workstation. Information that is associated with the embedded application (e.g., the help system) is still stored on the device, but is accessed through standard management communication protocols that allow the client workstation to communicate with the device. However, because of the limited CPU power, the device can only act as a "dumb" HTTP server, and can only serve static files from its memory. In this case, the static files need to be uncompressed within the client workstation since the device does not have sufficient CPU power for uncompression.

SUMMARY OF THE INVENTION

Accordingly, various embodiments of the present invention disclose a method and system for footprint minimized hypertext markup language/hypertext transfer protocol (HTML/HTTP) based system for Java-based embedded applications. Embodiments of the present invention provide for Java-based applications that allow for access to HTML/HTTP based information from a client workstation, thereby increasing the effectively available amount of memory on a device, and minimizing the necessary applications to be loaded on a client device that is interacting with the device.

Specifically, in one embodiment, a method is disclosed for accessing HTTP/HTML based information by a client workstation from a device. The embodiment of the method begins by establishing communication with a device that is associated with an embedded application. The communication is established through a first browser window that is Java-enabled. The method then continues by retrieving a Java applet from the device for implementing the embedded application. That is, the first browser allows for interaction with the embedded application (e.g., provides a configuration tool for the device).

Thereafter, the embodiment of the method continues by running an HTTP server inside the Java applet on the client workstation. The HTTP server is capable of generating HTML/HTTP based files, wherein the HTML/HTTP based files are associated with the embedded application (e.g., a help system for the embedded application).

DETAILED DESCRIPTION OF THE INVENTION

Reference will now be made in detail to the preferred embodiments of the present invention, a method and system of accessing hyptertext markup language/hyptertext transfer protocol (HTML/HTTP) based information from a client workstation, examples of which are illustrated in the accompanying drawings.

Accordingly, various embodiments of the present invention disclose a method and system for footprint minimized HTML/HTTP based system for Java-based embedded applications. Embodiments of the present invention provide for Java-based applications that allow for access to HTML/HTTP based information by a client workstation, thereby increasing the effectively available amount of memory on a device, and minimizing the number of necessary applications to be permanently loaded on a client workstation that is interacting with the device.

Notation and Nomenclature

Figure 1:
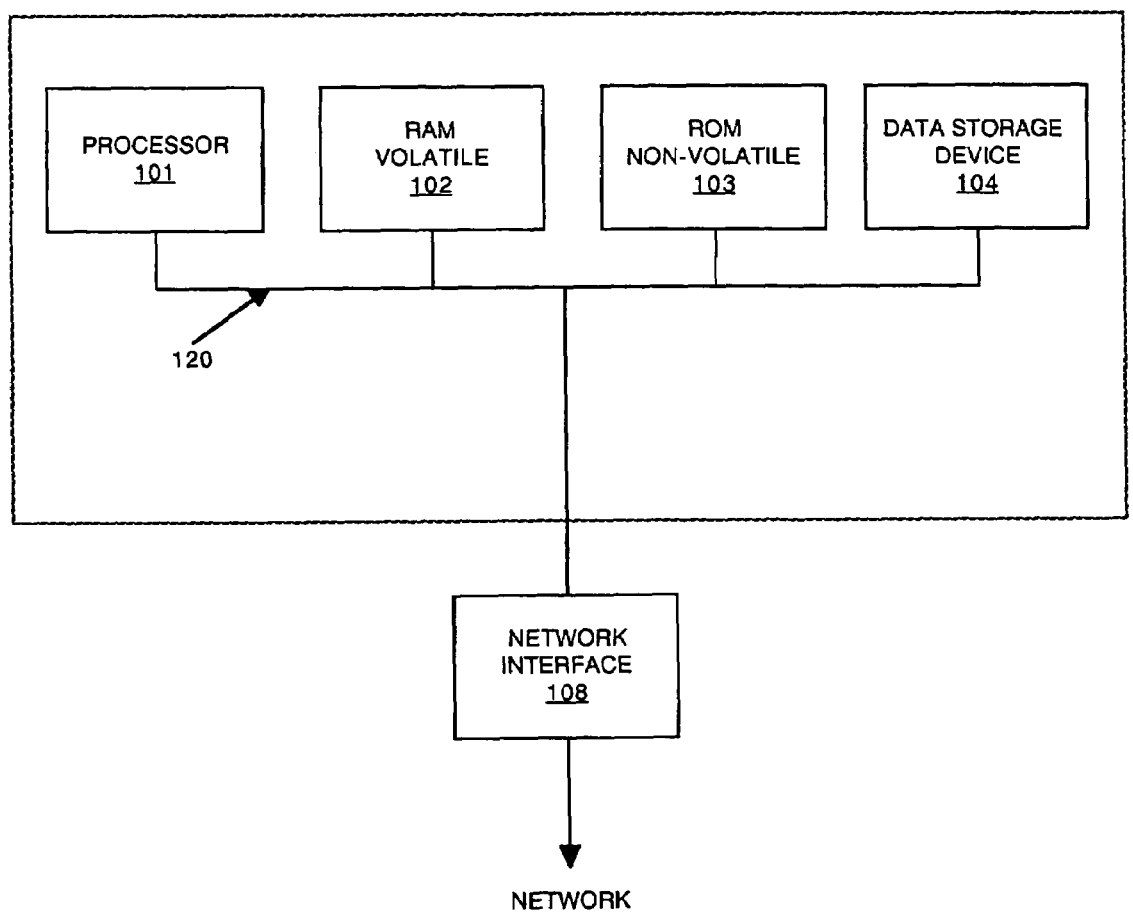
FIG. 1 is a block diagram of an electronic device that is capable of accessing HTML/HTTP based information by a client workstation, in accordance with one embodiment of the present invention.

Referring now to FIG. 1, portions of the present invention are comprised of computer-readable and computer-executable instructions which reside, for example, in computer-readable media of an electronic system that are networked devices, such as, a server computer, mainframe, networked computer, workstation, hub, router, switch, firewall, access server, and the like. FIG. 1 is a block diagram of interior components of an exemplary electronic system 100, upon which embodiments of the present invention may be implemented.

While embodiments of the present invention are described within the context of networked devices, other embodiments of the present invention are well suited to implementations within any electronic device. More specifically, other embodiments of the present invention are well-suited for methods and systems of upgrading and/or reloading system software on any electronic device.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "retrieving," "accessing," "establishing," "running," "generating," "opening," and "storing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Method and System for Accessing HTML/HTTP Based Information

Figure 2:
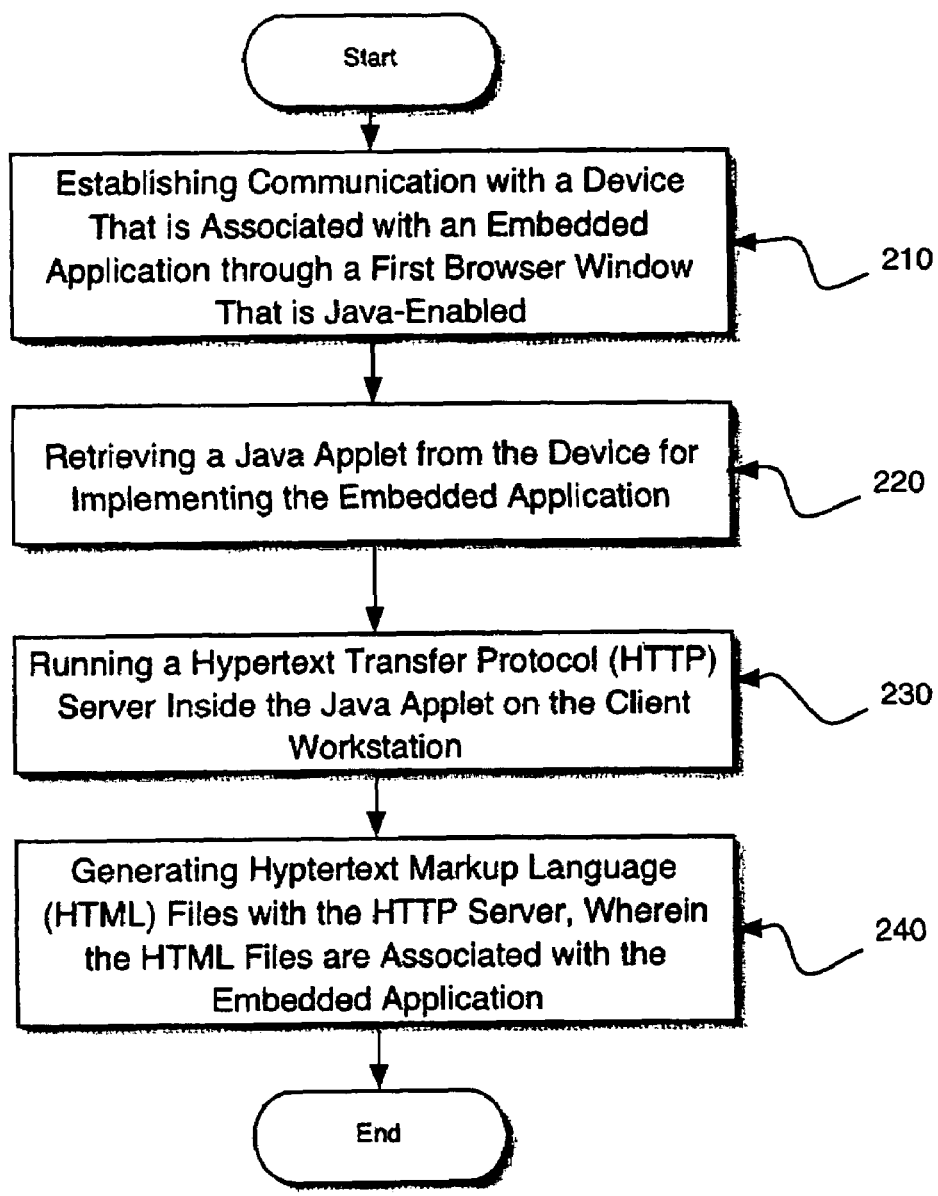
FIG. 2 is flow chart illustrating steps in a computer implemented method for accessing HTML/HTTP based information by a client workstation, in accordance with one embodiment of the present invention.
Figure 3:
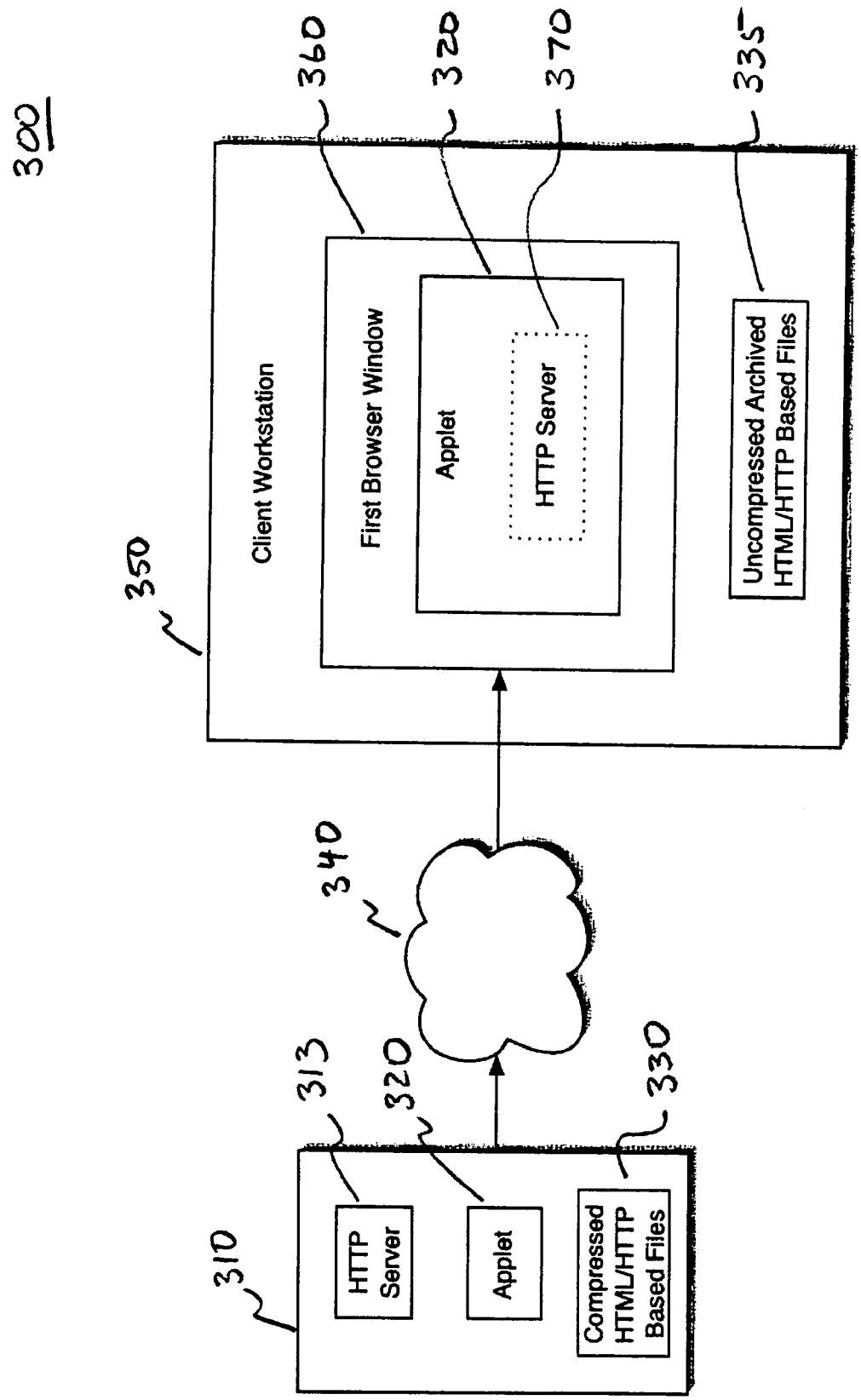
FIG. 3 is a data flow diagram illustrating the flow of information for transferring HTML/HTTP based information from a device to a client workstation, in accordance with one embodiment of the present invention.
Figure 4:
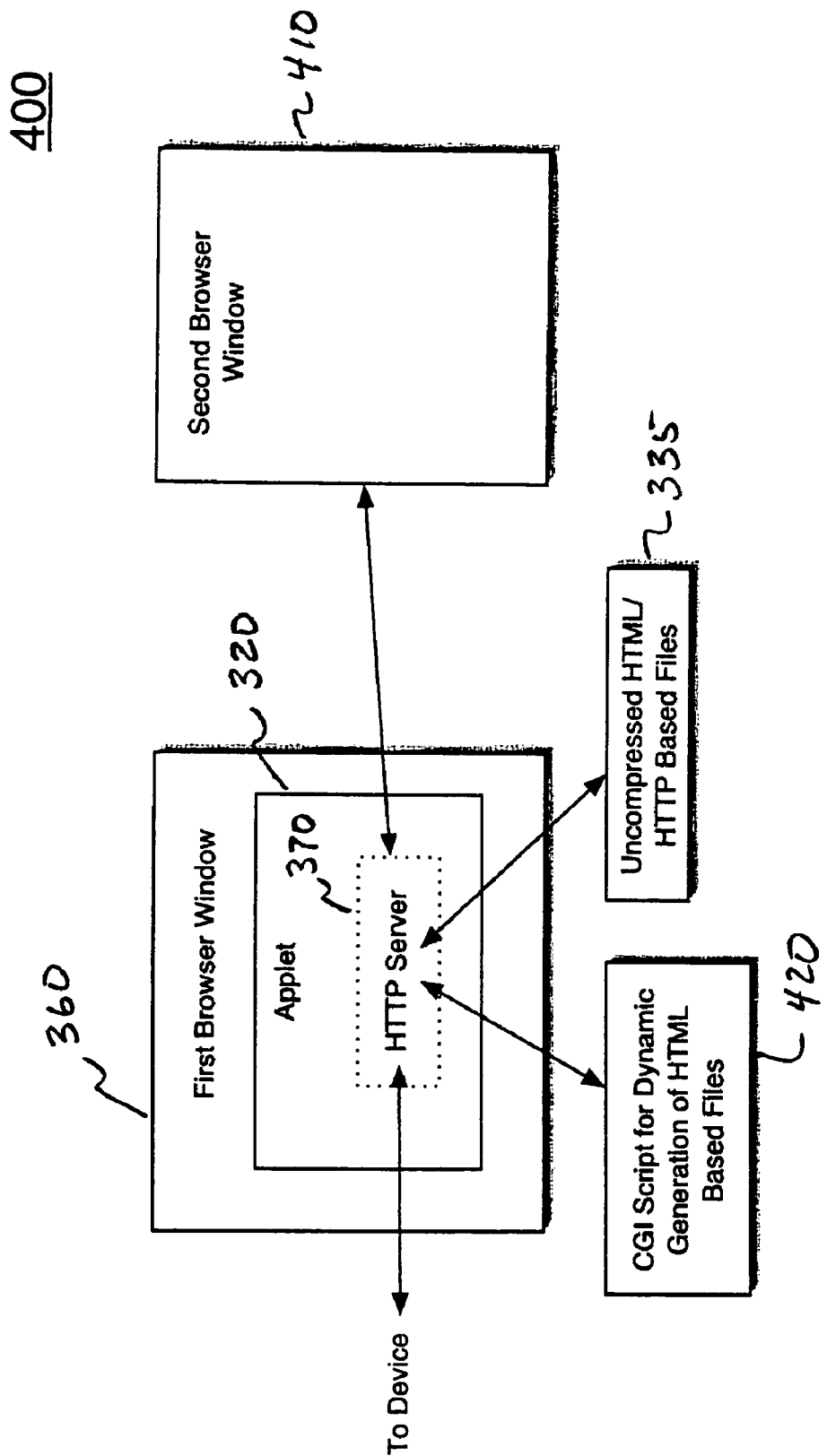
FIG. 4 is a data flow diagram illustrating the flow information for accessing HTML/HTTP based information by a client workstation, in accordance with one embodiment of the present invention.

The flow chart of FIG. 2 and the flow diagrams of FIGS. 3 and 4 describe the processes used for accessing HTML/HTTP based information by a client workstation, in accordance with embodiments of the present invention. Accessing the HTML/HTTP based information by the client workstation allows for a more effective usage of scarce memory resources on a remote device from which the HTML/HTTP based information originates, and a minimizing usage of processing power on a remote device for accessing the HTML/HTTP based information.

Referring now to FIG. 2, a flow chart 200 is disclosed illustrating steps in a computer implemented method for accessing HTML/HTTP based information by a client workstation, in accordance with embodiment of the present invention. The method as disclosed in the present embodiment is useful for environments involving embedded (device-resident) applications (e.g., a device management application) that are sufficiently complex and memory intensive; environments which need to deliver a large amount of HTML based content from the device (e.g., a help system for the embedded application); and environments where the device has a limited amount of processing power from the central processing unit (CPU) and limited memory (e.g., flash memory).

The present embodiment begins by establishing communication with a device, at 210. The communication is established through a browser window that is Java-enabled on a client workstation. That is, for example, at the client workstation, a user can interact with and access the device through the browser window.

The device is associated with and is the source of an embedded application. For example, the embedded application can be a device management application that allows a user to interact with and configure the device. Included within the embedded application are other system applications, such as, an HTML/HTTP based help system that is equally accessible through a network (e.g., the Internet).

The embedded application doesn't necessarily need to be explicitly installed on the client workstation, nor does it permanently install pieces on the workstation. As soon as there is Internet protocol (IP) connectivity with the device, the user can bring up the embedded application within a browser on the client workstation.

At 220, the present embodiment continues by retrieving a Java applet from the device for implementing the embedded application. That is, in the present case, a Java applet is transferred from the device to the client workstation. More specifically, the Java applet is executed by the Java-enabled window on the client workstation. In one embodiment, the embedded application is included within the Java applet.

At 230, the Java applet provides for HTTP functionality at the client workstation in the Java-enabled window. More specifically, the present embodiment runs a HTTP server inside the Java applet on the client workstation.

At 240, the present embodiment continues by generating HTML files with the HTTP server. As such, the HTTP server on the client workstation can be used to access information associated with the embedded application and/or the device.

FIG. 3 is a data flow diagram 300 illustrating the flow of information from the device to the client workstation that allows for the transfer of an HTTP server to the client workstation that provides for access to HTML/HTTP based information from the client workstation, wherein the HTML/HTTP based information is associated with and originates from the device.

A device 310 is shown in the data flow diagram 300. The device 310 comprises an HTTP server 313, a Java-applet 320, and compressed HTML/HTTP based files 330. The HTTP server 313 provides for an interface with the device so that remote resources, such as the client workstation 350 is able to communicate with the device 310 through a network 340 (e.g., the Internet).

The Java applet 320 is comprised of a program of instructions that allows for accessing HTML/HTTP based information from the client workstation. The Java applet 320 is transferred to the client workstation 350 through the network 340. In addition, the Java applet provides for implementation of the embedded application (e.g., a device management application).

Compressed HTML and image files 330 are also stored on the device 310. Because the device 310 has limited memory, the HTML and image files 330 are compressed to maximize memory usage within the device. The compressed HTML and image files 330 are associated with the embedded application. For example, the compressed HTML and image files 330 can provide an HTML/HTTP based help system for the embedded application.

At the client workstation 350, a first browser window 360 is opened in order to interact with the device 310 through the network 340. The first browser window 360 interacts with the HTTP server to retrieve the applet 320. Execution of the Java applet 320 on the first browser window 360 allows for implementation of the embedded application. For example, the Java applet 320 provides an interface through which a user can interact with and configure the device 310.

Additionally, the Java applet includes an HTTP server 370 which is implemented on the client workstation 350 through the first browser window 360. That is, the HTTP server 370 comprises a minimal HTTP server that runs as part of the Java applet 320 on the client workstation 350.

At startup, the HTTP server 370 temporarily downloads a single, compressed archive file from the device. The compressed archive file comprises the compressed HTML and image files 330 from the device 310. In addition, the Java applet 320 is capable of extracting the HTML and image files 335 out of the archive file. That is, the Java applet 320 is capable of uncompressing the archive file to extract the HTML and image files 335 that are uncompressed.

Moreover, the uncompressed HTML and image files 335 are temporarily stored in the client workstation 350. As such, the HTTP server 370 provides a means for accessing the HTML/HTTP based information provided in the uncompressed HTML and image files 335. That is, the HTTP server 370 is able to serve out the HTML and image files in response to an HTTP request without going back to the device 310.

FIG. 4 is a data flow diagram 400 illustrating the flow of information between browser windows that provides for access to HTML/HTTP based information from the client workstation, wherein the HTML/HTTP based information is associated with and originates from a remote device. The data flow diagram is comprised of components within the client workstation 350 of FIG. 3.

In the data flow diagram 400, the fist browser window 360 comprises the Java applet 320 that includes the HTTP server 370. As described previously, the HTTP server 370 serves up HTML/HTTP based content in response to HTTP requests.

A second browser window 410 is opened for communication with the HTTP server 370 to access the HTML/HTTP based files, such as, the uncompressed HTML and image files 335. More specifically, the first time the embedded application brings up the second browser window 410 (e.g., in response to a request to show help content), the client workstation is used as the target host so that the second browser window is looking to the HTTP server 370. Moreover, the non-standard protocol port over which the HTTP server was registered is used to form the URL for the first browser window 360. As such, the second browser window 410 looks to the first browser window 360 to get the help content from the HTML/HTTP based information. That is, the second browser window 410 sends HTTP requests for information to the HTTP server 370 of the Java applet in the first browser window 360.

As described previously, the HTTP server 370 can serve the uncompressed HTML and image files 335 directly from the client workstation 350.

On the other hand, the HTTP server 370 is also able to interact with a common gateway interface (CGI) script 420 that is able to dynamically generate the HTML/HTTP based information, in another embodiment. That is, the CGI scrip 420 is able to access information and format the results in HTML. The information may be accessed from a database that includes the uncompressed HTML and image files 335, or directly from the device 310. In this case, the present embodiment is able to dynamically generate the HTML/HTTP based information that is returned to the second browser window 410 in response to an HTTP request.

Accordingly, various embodiments of the present invention disclose a method and system for footprint minimized HTML/HTTP based system for Java-based embedded applications. Embodiments of the present invention provide for Java-based applications that allow for access to HTML/HTTP based information by a client workstation, thereby increasing the effectively available amount of memory on a device, and minimizing the necessary applications to be loaded on a client workstation that is interacting with the device. Because of the transfer of processing of HTML/HTTP based information from the device to the client workstation, embodiments of the present invention are well-suited for environments involving embedded (device-resident) applications (e.g., a device management application) that are sufficiently complex and memory intensive; environments which need to deliver a large amount of HTML based content from the device (e.g., a help system for the embedded application); and environments where the device has a limited amount of processing power from the CPU and limited memory (e.g., flash memory).

While the methods of embodiments illustrated in flow chart 200 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for accessing HTML/HTTP based information from a client workstation are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method comprising:
opening a first browser window that is Java-enabled in a client device, the first browser window to access a remote device over a network, the remote device having a Java applet that, when executed in the first browser window, implements an embedded application that interacts and configures the remote device and a hypertext transfer protocol (HTTP) server application;
receiving the Java applet from the remote device over the network with the first browser window;
opening a second browser window for communication with the HTTP server application to access a hypertext markup language (HTML) based file or an image file;
using a number associated with a non-standard protocol port over which the HTTP server application is registered to form a uniform resource locator (URL) for the second browser window to access; and
executing the Java applet with the first window of the client device to implement, in the client device, both the embedded application associated with the remote device and the HTTP server application, where the HTTP server application implemented in the client device downloads an archive file from the remote device over the network, extracts at least one of the HTML based file or the image file from the archive file according to the Java applet, and serves, to the second browser window in the client device, at least one of the HTML based file or image file received from the remote device responsive to at least one HTTP request for the HTML based file or image file received from the second browser window.

2. The method of claim 1, where the HTML based file or the image file are compressed when received from said remote device; and
further comprising uncompressing with said Java applet.

3. The method of claim 1, further comprising:
sending the HTTP request to said HTTP server application through said second browser window to access the HTML based file or the image file.

4. The method of claim 1, further comprising:
using a client workstation as a target host for said second browser window.

5. The method of claim 1, further comprising:
dynamically generating the HTML based file or the image file using a common gateway interface (CGI).

6. A computer system comprising:
a processor
a bus; and
a memory coupled to said processor and containing program instructions that, when executed, are adapted to:
open a first browser window that is Java-enabled in a client device, the first browser window to access a remote device over a network, the remote device having a Java applet that, when executed in the first browser window, implements an embedded application that interacts and configures the remote device and a hypertext transfer protocol (HTTP) server application;
receive the Java applet from the remote device over the network with the first browser window;
open a second browser window for communication with the HTTP server application to access a hypertext markup language (HTML) based file or an image file;
use a number associated with a non-standard protocol port over which the HTTP server application is registered to form a uniform resource locator (URL) for the second browser window to access; and
execute the Java applet with the first window of the client device to implement, in the client device, both the embedded application associated with the remote device and the HTTP server application, where the HTTP server application implemented in the client device downloads an archive file from the remote device over the network, extracts at least one of the HTML based file or the image file from the archive file according to the Java applet, and provides to the second browser window in the client device, at least one of the HTML based file or image file to one or more network devices responsive to at least one HTTP request for the HTML based file or image file from the network devices received from the second browser window.

7. The computer system of claim 6, wherein the program instructions that, when executed, are adapted to:
retrieve HTML based file or image file are compressed when received from said device; and
uncompress HTML based file or image file using said Java applet.

8. The computer system of claim 6, wherein the program instructions that, when executed, are adapted to:
sending the HTTP request to said HTTP server application through said second browser window to access HTML based file or image file.

9. The computer system of claim 6, wherein the program instructions that, when executed, are adapted to:
using the computer system as a target host for said second browser window.

10. The computer system of claim 6, wherein the program instructions that, when executed, are adapted to:
dynamically generating HTML based file or image file using a common gateway interface (CGI).

11. A memory comprising computer-executable instructions that, when executed by a processor, perform a method for accessing information from a client workstation, comprising:
opening a first browser window that is Java-enabled in a client device, the first browser window to access a remote device over a network, the remote device having a Java applet that, when executed in the first browser window, implements an embedded application of that interacts and configures the remote device and a hypertext transfer protocol (HTTP) server application;
receiving the Java applet from the remote device over the network with the first browser window;
opening a second browser window for communication with the HTTP server application to access a hypertext markup language (HTML) based file or an image file;
using a number associated with a non-standard protocol port over which the HTTP server application is registered to form a uniform resource locator (URL) for the second browser window to access; and
executing the Java applet with the first window of the client device to implement, in the client device, both the embedded application associated with the remote device and the HTTP server application, where the HTTP server application implemented in the client device downloads an archive file from the remote device over the network, extracts at least one of the HTML based file or the image file from the archive file according to the Java applet, and serves, to the second browser window in the client device, at least one of the HTML based file or image file received from the remote device responsive to at least one HTTP request for the HTML based file or image file received from the second browser window.

12. The computer-readable medium of claim 11, further comprising:
   uncompressing the HTML based file or the image file with said Java applet when received from said remote device in a compressed format.

13. The computer-readable medium of claim 11, further comprising:
   sending the HTTP request to said HTTP server application through said second browser window to access the HTML based file or the image file.

14. The computer-readable medium of claim 11, further comprising:
   using a client workstation as a target host for said second browser window.

15. The computer-readable medium of claim 11, further comprising:
   dynamically generating the HTML based file or the image file using a common gateway interface (CGI).

\* \* \* \* \*

UNITED STATES PATENT AND TRADEMARK OFFICE
CERTIFICATE OF CORRECTION

| | |
|---|---|
| PATENT NO. | : 7,580,990 B1 |
| APPLICATION NO. | : 10/697069 |
| DATED | : August 25, 2009 |
| INVENTOR(S) | : Maximilian Josef Spring |

It is certified that error appears in the above-identified patent and that said Letters Patent is hereby corrected as shown below:

At column 8, line 51, please delete "of" following the word --application--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,580,990 B1
APPLICATION NO. : 10/697069
DATED : August 25, 2009
INVENTOR(S) : Maximilian Josef Spring It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Fourteenth Day of December, 2010

David J. Kappos
*Director of the United States Patent and Trademark Office*